May 30, 1939.   H. W. FLETCHER   2,160,263
PIPE JOINT AND METHOD OF MAKING SAME
Filed March 18, 1937

Harold W. Fletcher
INVENTOR

BY Jesse R. Stone
ATTORNEY

Patented May 30, 1939

2,160,263

UNITED STATES PATENT OFFICE 2,160,263

PIPE JOINT AND METHOD OF MAKING SAME

Harold W. Fletcher, Houston, Tex., assignor to Hughes Tool Company, Houston, Tex., a corporation of Delaware Application March 18, 1937, Serial No. 131,681

6 Claims. (Cl. 29—148.2)

My invention relates to pipe joints where a coupling is made between tubular members.

The invention has for its principal object the formation of a mechanically tight joint with maximum friction at the contacting surfaces, as well as a pressure tight connection, in such a way as to permit adjustment of the stress relation in the members independent in some degree of their initial conformation. It is particularly adaptable to connections subjected to torque and vibration.

As an example of an important use to which the invention is applicable, the attachment of tool joints to sections of drill stem employed in rotary well drilling will be considered. Both the box and pin members of such a joint are formed with a socket to receive the end of the drill stem section. Said socket is normally threaded with a comparatively fine thread and, in securing the joint to the stem section, it is common to screw the parts together with considerable force. To avoid galling of the threads, the threads have to be lubricated and the screwing up operation must be done slowly enough not to heat up the threads too much. Satisfactory performance of such a joint requires high precision in the fit of mating threads which is expensive and difficult to maintain.

It is an object of this invention to form an intimately contacting joint even where the connecting areas are not carefully formed or threaded, thus reducing the necessity of precision work in forming the connecting members.

I further aim to do away with the necessity of lubrication of the connecting areas, thus securing a higher coefficient of friction without danger of galling of threads such as is now frequently encountered in the assembly of screwed connections even when lubricated.

It is an object to expand the male member into close contact with the socket member without the necessity of rotating the male member relative to the socket or of manufacturing to close limits and heating to a controlled temperature as is required in making a shrink fit.

It is obvious that the socket might be contracted upon the male member by applying the force externally and similar results secured.

In illustrating my invention I have shown its application to a tool joint as previously indicated.

In Fig. 1 is shown a side view, partly in section and partly in elevation, of a pipe and joint connection and illustrating the first step in making-up the joint.

Figure 1:
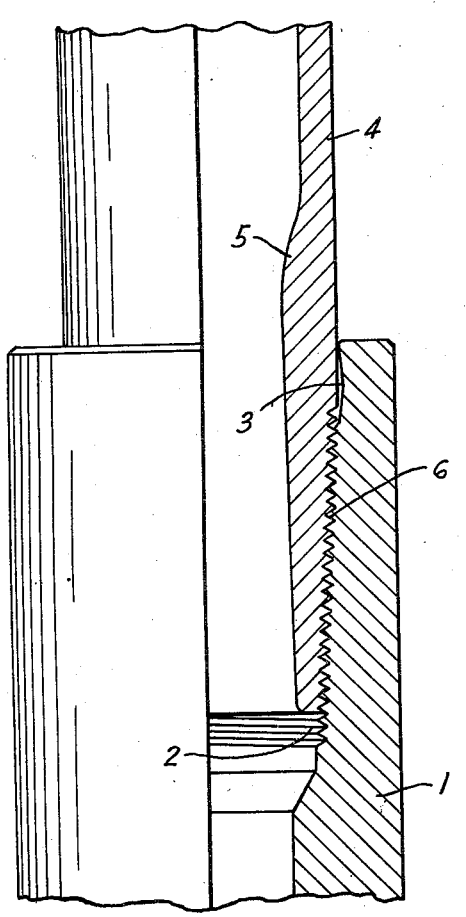
Figure 2:
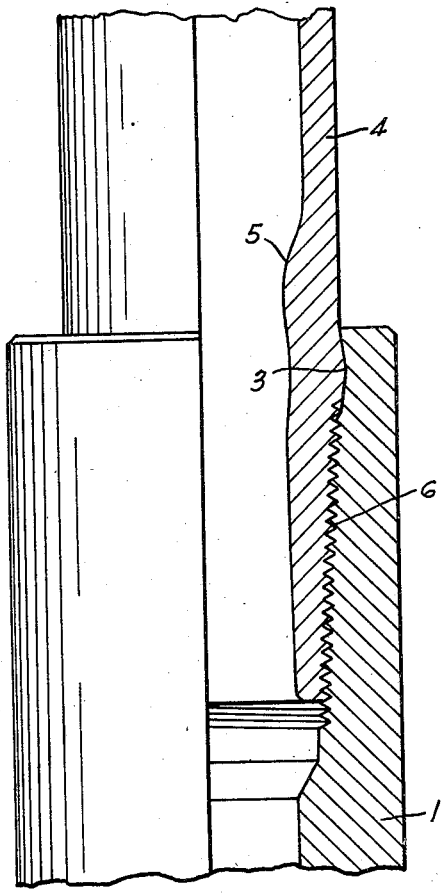
Fig. 2 is a similar view showing the connection as completed.
Figure 3:
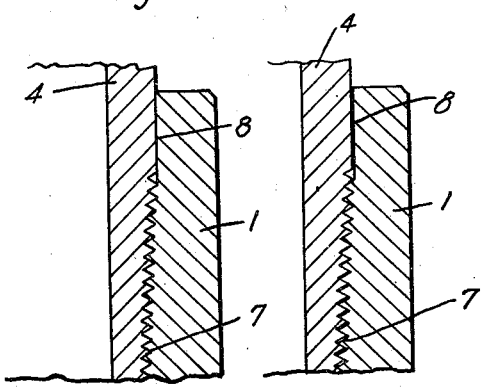
Fig. 3 is a broken sectional view showing the sealing area of an imperfect joint, after it has been made-up.

In Fig. 1, the pipe socket end of the joint 1 is shown at 2. The socket is flared outwardly and threaded in the usual manner. Adjacent the larger end of the socket the joint may be formed with a smooth unthreaded sealing area, as shown in Fig. 3, but I contemplate that this area may be recessed slightly at 3 by forming a shallow annular groove in the unthreaded area of the box.

The pipe or drill stem section 4 may be internally upset at 5, although this feature is not material to the employment of my invention.

The connecting end is tapered and threaded at 6 to engage within the socket and there is a smooth unthreaded area opposed to the recessed area 3 of the box.

The threaded areas need not tightly interengage and I form the connection by screwing the joint member upon the pipe end by hand. Even if the threads or the taper of the joint are not accurately formed, no threads will be damaged by the hand screwing of the joint. I then expand the pipe end from the interior outwardly to force it tightly into sealing contact with the interior of the socket of the joint. Such expanding devices are common and no particular form or construction of expander is necessary. When a rotary expander is used, the expander may be moved along the interior of the pipe end and it will be obvious that the pipe may be expanded unequally, where desired, as when the pipe is forced outwardly into the recess 3 in the box.

By thus rolling the cold metal of the pipe end outwardly the stress gradient may be controlled, sharp transitions avoided, and hence improved resistance to fatigue secured. A seal thus obtained is therefore better enabled to withstand the stresses due to the torque encountered in drilling as well as the flexing of the drill stem due to crooked hole or otherwise.

Figure 4:
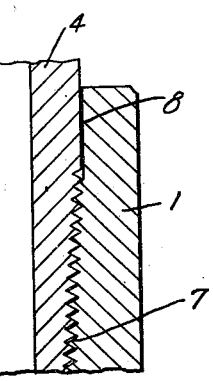
Fig. 4 is a view similar to Fig. 3 before the seal has been accomplished.

In Fig. 4 the taper and the thread construction of the socket engaging area is shown as imperfect. When screwed up by hand the threads at 7 do not seal. Such defects are completely remedied by my method of sealing the joint. When the pipe end is rolled outwardly and expanded, the threads are tightly engaged, as shown in Fig. 3, and the smooth, unthreaded area 8 is forced into close sealing contact with the mating surface on the coupling. Obviously the coupling member may be compressed by cold working to obtain a similar result.

It will be understood that this connection is not adapted to be unscrewed and disconnected after it is once made-up, it becomes, in effect, an integral connection of joint member and pipe. No lubricant is employed, so that the threads form a tight frictional interfit which prevents the passage of fluid and thus forms a fluid tight joint.

The fact that the contacting joint areas are distorted into a close engagement even where imperfectly interfitting before expansion, enables such a connection to be made even where no threads are formed on the engaging areas. It will be seen that these areas may be formed with annular grooves instead of threads or the areas may be simply roughened, or formed with a plurality of recesses such as that shown at 3. In all such cases, the pipe end may be expanded and forced outwardly into the irregularities in the socket and an approximately integral engagement will result.

It will be obvious that this process makes for a superior type of connection at an economical expenditure of time and labor.

What I claim as new is:

1. The method of connecting a tapered threaded pin with a tapered and threaded box member of a pipe joint consisting of screwing the two members together with a force insufficient to impair the threads, then expanding the pin members outwardly from within along the entire tapered and threaded area and forcing the said threaded members into tight sealing engagement so that said threads may not again be unscrewed.

2. The method of engaging a coupling member upon the end of a pipe section, including forming interengaging tapered areas upon the said member and section, interfitting the parts together and then cold working said metal of said section and expanding it outwardly into close frictional contact with said member so as to resist relative rotation of the said section in said member.

3. In securing a tool joint to a drill stem section the steps of screwing the joint upon the stem section, exerting an expansive pressure along the interior of said pipe section to increase the outer diameter thereof and engage the drill stem section rigidly within said tool joint along the entire area of engagement.

4. A tool joint having a tapered threaded box to engage a drill stem section, an annular recess adjacent said threaded area, a drill stem section tapered and threaded to engage within said box, and an annular ridge on said section fitting tightly within said recess.

5. A coupling member having an internal threaded area and a recessed unthreaded area adjacent thereto, a pipe section threaded to screw within said coupling member, and a ridge of metal upon said pipe section expanded to fit tightly within said recessed area.

6. The process of connecting a tool joint member upon a taper threaded pipe end, including forming a threaded socket to receive said end and leaving a smooth but recessed area adjacent the outer end of said socket, engaging said pipe end closely within said joint member with the opposing areas of said members substantially parallel, then exerting a radial distorting force on said pipe end to distort the metal of said pipe end outwardly to increase its outer diameter along the tapered area and thus force the metal of said pipe member into sealing engagement with said socket and expanding the metal of said pipe into said recessed area, thus forming a rigid connection which cannot be disconnected.

HAROLD W. FLETCHER.